United States Patent Office 3,234,443
Patented Feb. 8, 1966

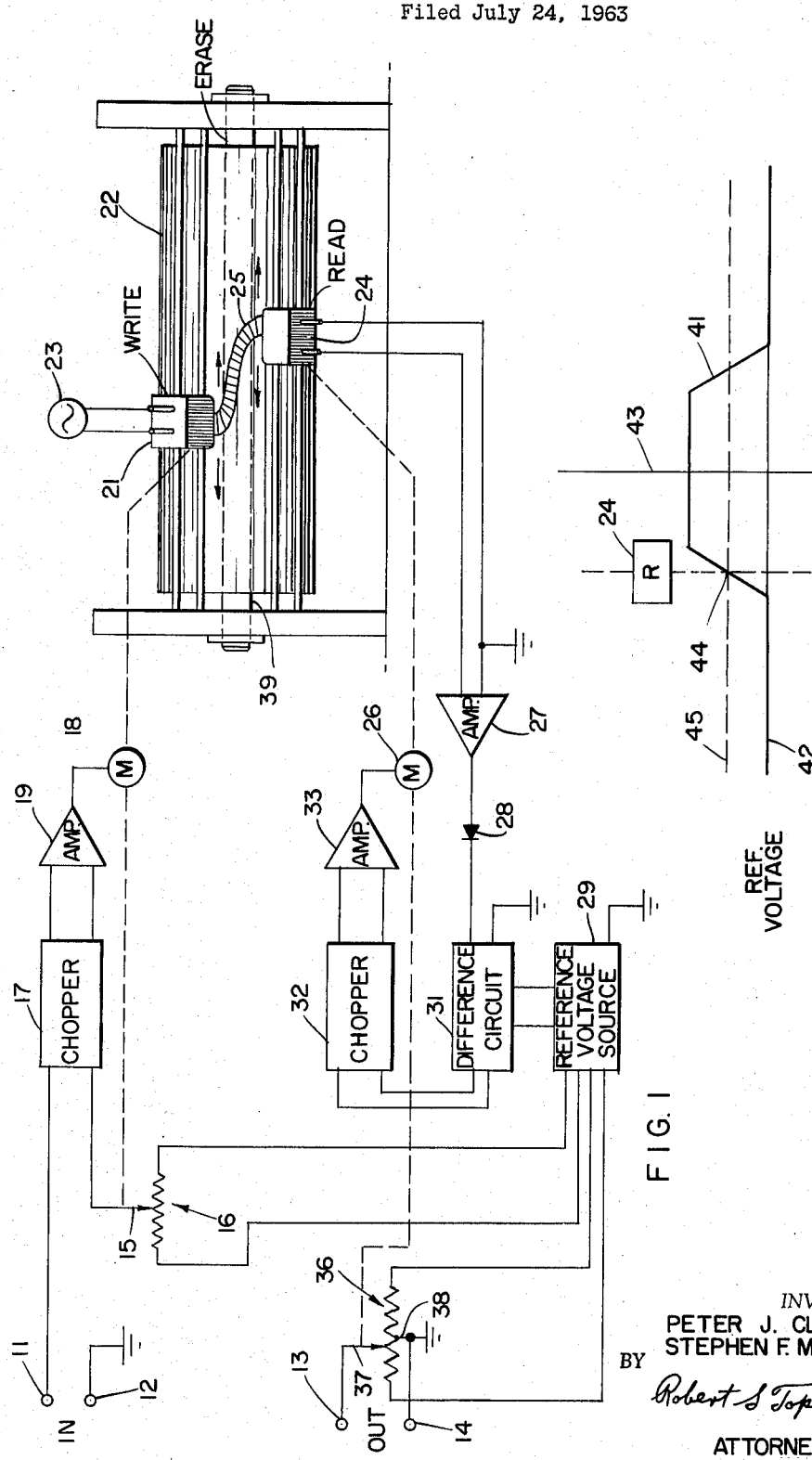

3,234,443
ANALOGUE SIGNAL DELAY DEVICE
Peter J. Clack, Bedford, and Stephen F. Marcotte, Sharon, Mass., assignors to Laboratory for Electronics, Inc., Boston, Mass., a corporation of Delaware
Filed July 24, 1963, Ser. No. 297,276
8 Claims. (Cl. 318—19)

This invention relates generally to automatic controls for industrial processes and, more particularly, it concerns the delay of analogue signals representing a measure of a product characteristic to optimize the mode of control of the process.

In an increasing number of industrial processes, automatic means have been devised to control the characteristics of a product which must be held to close tolerances. A device which has accelerated the developement of controls of this type in recent years is the beta gauge, wherein the absorptive effect of the product on penetrative radiation is applied to the measure of density, thickness, and other related parameters. A major advantage of the beta gauge is its high degree of measuring accuracy.

Due to the peculiar nature of the various operations involved in certain kinds of processes, it is sometimes a problem, however, to translate measures of the characteristic to be controlled into a precise mode of corrective action to maintain the characteristic within the desired tolerances. An example of where this problem arises is in the coating of a traveling sheet of material, such as paper, plastic or steel. To measure the thickness of the coating, separate measurements must usually be made of the thickness of the sheet before and after it is coated, and this usually requires separate gauge elements that are physically spaced a considerable distance apart. The result is that unless some special provision is made for adjusting the measurements from the gauges on a time basis, they will not be representative of thickness before and after coating of the same area of the sheet and, hence, cannot be taken as a true indication of coating thickness.

To solve this problem, various schemes have been proposed for delaying the signals from the gauge which measures uncoated thickness and for comparing them with the gross thickness signals after a delay period corresponding to the time it takes for the sheet to advance from the one gauge to the other. Digital storage techniques are, of course, a possibility, but as the measurement signals are generally produced in analogue form and analogue signals are generally required for process control purposes, digital storage entails a costly double conversion process. One scheme that has been used in the past is to record the analogue signals on a magnetic tape or drum in the form of a frequency or amplitude modulated sinusoidal signal, and to reproduce this signal after the desired delay period has transpired. A disadvantage of frequency modulated signals is that variations in tape or drum speed affect the frequency of the reproduced signal and oftentimes the speed of the drum cannot be maintained constant because the speed of the traveling sheet varies and the speed of the drum must be synchronized with it to maintain the proper amount of delay. Amplitude modulation suffers from the disadvantage that any slight fluctuations in recording level or magnetization characteristics adversely affects the fidelity of the reproduced signal. The same is true of speed variations, although to a lesser degree than with frequency modulation.

Accordingly, it is an object of this invention to provide an improved analogue signal delay device for use in controlling a process.

A more specific object is to provide an analogue signal delay device of this character, which is highly accurate and reliable, and yet it is not unreasonably expensive.

Another object pursuant to the foregoing object is to provide an analogue signal delay device, which for the most part incorporates standard components that are readily available commercially.

In brief, the delay device in accordance with the present invention incorporates a magnetic drum type record medium to store the analogue signal for a time corresponding to the desired delay. The analogue signal is recorded on the drum, not in the form of a varying signal characteristic, such as amplitude, frequency, or pulse code, but rather as a track of indexing signals whose locus varies longitudinally of the drum. To produce this track, a movable write head is provided, which is positionally responsive to the analogue signal, and to sense the position of the write head, there is a movable read head, which is adapted to remain in registry with the track after it has been rotated through a predetermined angle, corresponding to the desired delay. The position of the read head is controlled by a servo-positioning system such that when the read head begins to deviate from the track, a variation occurs in the signal sensed by the head. This gives rise to an error signal by means of which a servomotor is energized to drive the head back into registry with the track and recreate a condition of null balance. A delayed version of the analogue input signal is derived from a potentiometer, which like the read head is positionally controlled by the servomotor.

The novel features of the invention, together with further objects and advantages will become more readily apparent from the following detailed description of a preferred embodiment as shown in the accompanying drawing. In the drawing:

FIG. 1 is a block diagram of the delay device in accordance with the present invention; and FIG. 2 is a diagram of the signal strength reproduced by the read head of FIG. 1, as a function of displacement of the head widthwise of the track.

With reference now to FIG. 1, it will be observed that the numerals 11, 12 designate input terminals for the analogue signal to be delayed, while the numerals 13, 14 have reference to a pair of output terminals where it is desired to provide a delayed version of the analogue input signal. Coupled between the undergrounded input terminal 11 and the movable arm 15 of a motor driven potentiometer 16 is a chopper 17 which converts to a corresponding A.C. voltage, the voltage appearing between terminal 11 and arm 15. Motor 18 which drives the potentiometer is energized by a servoamplifier 19, which in turn is coupled to the output side of the chopper. By way of example, chopper 17 may take the form of a vibratory contact, a modulating capacitor, or any other known mechanism of this kind, as the invention imposes no special requirements on the type of conversion device employed.

In addition to the potentiometer, motor 18 also controls the longitudinal position of a write head 21 which cooperates with a magnetic drum 22. Drum 22 is rotated at a speed determined by the amount of delay which the input signal is to undergo, and write head 21 is supplied with a sinusoidal signal of constant frequency and amplitude. A low audio-frequency signal, such as eighty cycles per second, has been found to work out well in actual practice, and this can be obtained conveniently from a simple oscillator, such as that represented by the numeral 23 in FIG. 1. It is preferred not to use a sixty cycle signal or a harmonic thereof because of the problem of extraneous pickup. For ordinary applications, it is also preferred that this signal be recorded in a relatively wide track, for example, one or two inches wide, as this simplifies the reading process which is employed according to the invention. Parenthetically, it also simplifies the design of the head 21, rather than complicating it as is usually the case, where information storage density is the primary consideration.

Spaced angularly from write head 21 is a read head 24 for sensing the sinusoidal signal recorded on the track 25. To this end, read head 24 is mechanically coupled to a motor 26, which positions the read head laterally of the drum so that it remains in registry with the track. A positioning signal for the motor is derived from read head 24, which is coupled by way of an amplifier 27 to a rectifier 28. Rectifier 28 provides a corresponding direct current signal whose amplitude is compared with that of a constant amplitude signal from a source of reference voltage 29. This amplitude comparison takes place in a difference circuit 31, which has its output side coupled to a chopper 32. By means of this chopper, the difference of the voltages from the rectifier 28 and reference source 29 is converted to an alternating voltage which, after being amplified in an amplifier 33, is used to drive the motor 26. As in the case of chopper 17, chopper 32 may be entirely conventional.

To produce an output signal at terminals 13, 14, which is equivalent to a delayed version of the analogue input signal, there is provided a potentiometer 36 having a movable arm 37. Arm 37 is mechanically coupled to motor 26 and electrically coupled to the ungrounded output terminal 13. Terminal 14 is connected to a center tap 38 on the potentiometer 36. Finally, it will be observed, there is provided an erase head 39 which is angularly situated between the read and write heads. As shown in the drawing for clarity's sake, erase head 39 cooperates with the back side of the drum at a location midway between the read and write heads, but it should be understood that for maximum delay at any given drum speed, the read and write heads will have a relatively small angular spacing in the order of 4 degrees, corresponding to the amount of clearance required for the erase head. Unlike read and write heads 21, 24, erase head 39 is mounted in a fixed position and acts along the entire length of the drum. Heads of this kind, consisting essentially of an elongated bar magnet, are readily available commercially.

In operation, the analogue signal to be delayed is characterized by a differential input voltage and the magnitude and sense of this voltage is reflected in the position of the write head relative to a center or neutral position. To move the write head to its proper position, motor 18 is caused to run so long as the voltage appearing at the input terminals 11, 12 differs from that derived by the potentiometer 16 from the reference source 29, for under these circumstances an error voltage will be present at the input to the chopper. If this error voltage is positive, in the sense for example that the potential at terminal 11 is positive with respect to that at movable arm 15, then the phase of the output signal developed by the chopper causes the motor to run in the direction that moves write head 21 to the left. An error voltage of the opposite sense produces a phase reversal of the chopper output voltage causing the motor to run in the opposite direction and the head to move to the right. At the same time, there is produced corresponding movement of the potentiometer arm 15 tending to decrease the error voltage until a null balance is achieved; that is, until the voltage present at the input side of the chopper reaches a minimum threshold value insufficient to operate the motor. The net effect, therefore, is that the position of the track longitudinally of the drum is determined by the magnitude and sense of the analogue signal.

The operation of the read head 24 in following the recorded signal after it has been laid down by the write head and rotated in the direction of the arrows by an amount corresponding to the angular spacing of the read and write heads will best be understood with reference to FIG. 2. In FIG. 2, the signal strength 41 of the recorded signal is shown as it is reproduced by the read head when the head is at varying distances from the track center. Distance is measured along the horizontal axis 42 with reference to the center of the track 43, and signal strength is measured vertically. The scale of distance is expanded relative to that of FIG. 1.

From FIG. 2, it will be observed that the signal strength of the recorded signal has a maximum value which is essentially constant over the major portion of the track width and falls off linearly towards the edges of the track. In a preferred embodiment of the invention, read head 24 is adapted to register with one side of the track, for example, the left hand side where the signal strength is half this maximum value. The numeral 44 represents this location.

If it be assumed, for purposes of explanation, that a deviation of the read head from this location exists, the signal reproduced by the head will have an amplitude other than that represented by the level 45 in FIG. 2. As a result, the direct voltage, which appears at the input to difference circuit 31, and which represents the reproduced signal after it has been amplified and rectified, will have other than a predetermined reference value corresponding to the voltage supplied to the difference circuit 31 by reference source 29. By means of difference circuit 31 this voltage difference is translated into a D.C. error voltage whose magnitude and sense reflects the positional deviation of the read head, and by means of chopper 32, the D.C. error voltage is translated into a corresponding phase related A.C. voltage. After suitable amplification, the A.C. voltage is used to energize the motor 26 so that it drives the read head back towards the predetermined point of registry 44 halfway up on the side of the characteristic curve defining the response of the read head.

Owing to the fact that the response is sufficiently sharp in this region to achieve the degree of positioning accuracy required for most applications, irrespective of track width, it follows that a relatively wide track is desireable in order to obviate the possibility of the heads losing the track or coming into registry with the right hand edge where the sense of the error signal would be improper to correct for positional deviations. A track approximately 1¾ inches wide at the half power points has been found to work well with a read head having a characteristic response in terms of lateral sensitivity which is substantially less board than this. The function of the erase head is simply to erase the track so that a completely signal free surface on the drum is continually being presented to the write head.

To produce the desired output signal at terminals 13, 14, reference source 29 supplies a constant voltage to the potentiometer, which in turn is controlled by the motor 26. The opposite side of the potentiometer is coupled to the output terminals. Whenever the motor drives the read head to a new position, to maintain it in proper registry with a track, the setting of the potentiometer and hence the voltage at terminals 13, 14 is likewise caused to change, to reflect the changing position of the track as it comes under the read head. Since the position of the write head, when it made the track originally, is determined by the magnitude and sense of the analogue input voltage, it is evident that what it produced at the output terminals is a delayed version of the input voltage.

Although the invention has been described with reference to a particular type of null balancing system for positional control of the read and write heads, it will be recognized that other types of such systems could be used. For example, hydraulic cylinders might be used to actuate the heads in place of servomotors, and a D.C. form of servo control employed throughout. A refinement would be to incorporate an auxiliary read head having the same angular position as that of the read head described, but displaced therefrom laterally. This auxiliary head could then sense the fact that the main head had lost the track and cause it to reindex. Or the auxiliary head can simply be connected in parallel with the main head so that the width of track to which the read servo system responds is effectively doubled.

Various alternatives and refinements of this nature will occur to those skilled in the art, and therefore the invention should not be deemed to be limited to what has been described herein by way of illustration, but rather it should be deemed to be limited only by the scope of the appended claims.

What is claimed is:

1. An analogue signal delay device for use in controlling a process, said device comprising a rotating record medium having a generally cylindrical recording surface, a write head, a read head and an erase head cooperating with said record medium at angularly spaced locations adjacent said surface, means cooperating with said write head to record a signal on said surface, said signal being recorded in a track whose locus is determined by the longitudinal position of said write head relative to said surface, means to control the longitudinal position of said write head as a function of said analogue signal, means cooperating with said read head to cause it to follow the signal track recorded by said write head, and means to produce an output signal representing a delayed version of the analogue signal as a function of the longitudinal position of said read head.

2. The device, according to claim 1 wherein said means cooperating with said read head to cause it to follow said track, includes means to sense deviations in the amplitude of the signal reproduced by said read head with respect to a predetermined amplitude, and means to maintain said read head in registry with one side of the track in response to said sensing means for amplitude deviations.

3. The device, according to claim 2 wherein said means to register said read head includes a positioning motor, and said sensing means for amplitude deviations includes means to produce a reference signal whose amplitude is representative of the desired position of said read head relative to the track, means to produce an error signal when the amplitude relation of said reference signal to the signal reproduced by said read head differs from a predetermined relation, and means to energize said motor in response to said error signal.

4. The device, according to claim 1 wherein said means to control the position of said write head includes a positioning motor, means to produce a signal whose amplitude is representative of the position of said write head, means to relate the amplitude of said write head position signal with that of the analogue signal, means to produce an error signal when the amplitude relation of said position signal and the analogue signal differs from a predetermined relation, and means to energize said motor in response to said error signal.

5. An analogue signal delay device for use in controlling a process, said device comprising a rotating record medium having a generally cylindrical recording surface, a write head, a read head, and an erase head cooperating with said record medium at angularly spaced locations adjacent said surface, means cooperating with said write head to record a sinusoidal signal on said surface, said signal being recorded in a track whose locus is determined by the longitudinal position of said write head relative to said surface, means to control the longitudinal position of said write head as a function of said analogue signal, means cooperating with said read head to reproduce the recorded signal, means to sense deviations in the amplitude of the reproduced signal with respect to a predetermined amplitude, means to maintain said read head in registry with one side of the track in response to said sensing means for amplitude deviations, a source of voltage having a fixed amplitude, a potentiometer coupled to said source, and means to produce movement of said potentiometer corresponding to the movement of said read head.

6. The device, according to claim 5 wherein said means to register the read head includes a positioning motor and wherein said means to sense deviations in the amplitude of the reproduced signal includes means to convert the reproduced signal to a corresponding first direct voltage, means to produce a second direct voltage corresponding to deviations in the amplitude of said first direct voltage from a predetermined amplitude, and means to convert said second direct voltage to a corresponding alternating voltage for energizing said motor.

7. The device, according to claim 6 wherein said means to control the position of said write head includes a positioning motor, means to produce a signal whose amplitude is representative of the position of said write head, means to relate the amplitude of said write head position signal with that of the analogue signal, means to produce an error signal when the amplitude relation of said position signal and the analogue signal differs from a predetermined relation, and means to energize said motor in response to said error signal.

8. An analogue signal delay device for use in controlling a process, said device comprising a rotating record medium having a generally cylindrical recording surface, a write head, a read head, and an erase head cooperating with said record medium at angularly spaced locations adjacent said surface, means cooperating with said write head to record a sinusoidal signal on said surface, said signal being recorded in a track whose locus is determined by the longitudinal position of said write head relative to said surface, a positioning motor for said write head, a potentiometer adapted to be driven by said positioning motor, a source of direct voltage coupled to the input side of said potentiometer, a direct current to alternating current converter coupled to the output side of said potentiometer for producing an error signal representative of the difference between the direct voltage appearing at the output side of said potentiometer and the analogue voltage, a servoamplifier for energizing the motor in response to said error signal, means cooperating with said read head to reproduce the recorded signal, means to convert the reproduced signal to a corresponding first direct voltage, means to produce a second direct voltage corresponding to deviations in the amplitude of said first direct voltage from a predetermined amplitude, means to convert said second direct voltage to a corresponding alternating voltage, a motor to position said read head in response to said alternating voltage, a source of reference voltage, a potentiometer coupled to said source for producing a signal corresponding to a delayed version of the analogue signal, and means to vary the setting of said potentiometer in accordance with the position of said read head.

No references cited.

JOHN F. COUCH, *Primary Examiner.*